United States Patent
Kilmurray et al.

(10) Patent No.: US 8,174,382 B2
(45) Date of Patent: May 8, 2012

(54) DIAGNOSTIC SYSTEM HAVING A WAKE-UP CIRCUIT

(75) Inventors: Paul A. Kilmurray, Wixom, MI (US); Dung K. Lam, Royal Oak, MI (US); Issac R. Nielsen, Redford, MI (US); David B. Porter, Northampton (GB); Nicholas J. Sup, Commerce Township, MI (US)

(73) Assignee: Mahle International GmbH (DE)

( * ) Notice: Subject to any disclaimer, the term of this patent is extended or adjusted under 35 U.S.C. 154(b) by 408 days.

(21) Appl. No.: 12/476,233

(22) Filed: Jun. 1, 2009

(65) Prior Publication Data

US 2010/0127857 A1 May 27, 2010

Related U.S. Application Data

(60) Provisional application No. 61/116,824, filed on Nov. 21, 2008.

(51) Int. Cl.
  *G08B 21/00* (2006.01)
(52) U.S. Cl. ...................................... 340/540; 713/323
(58) Field of Classification Search .................. 340/540; 361/100; 379/27.06; 710/104; 713/323, 713/340
  See application file for complete search history.

(56) References Cited

U.S. PATENT DOCUMENTS

| | | | |
|---|---|---|---|
| 4,849,919 A | 7/1989 | Haneda | |
| 4,942,393 A | 7/1990 | Waraksa et al. | |
| 4,950,913 A | 8/1990 | Kephart | |
| 5,115,236 A | 5/1992 | Kohler | |
| 5,272,386 A | 12/1993 | Kephart | |
| 5,305,459 A | 4/1994 | Rydel | |
| 5,563,452 A | 10/1996 | Kephart | |
| 5,621,250 A | 4/1997 | Kim | |
| 5,675,811 A * | 10/1997 | Broedner et al. | 713/323 |
| 5,744,874 A | 4/1998 | Yoshida et al. | |
| 5,790,946 A | 8/1998 | Rotzoll | |
| 5,867,557 A * | 2/1999 | D'Andrea et al. | 379/15.02 |
| 6,031,465 A | 2/2000 | Burgess | |
| 6,100,814 A | 8/2000 | Doyle | |
| 6,115,831 A * | 9/2000 | Hanf et al. | 714/43 |
| 6,198,995 B1 | 3/2001 | Settles et al. | |
| 6,300,879 B1 | 10/2001 | Regan et al. | |
| 6,438,462 B1 * | 8/2002 | Hanf et al. | 700/297 |
| 6,525,648 B1 | 2/2003 | Kubler et al. | |
| 6,738,914 B2 | 5/2004 | Christopher | |
| 7,211,907 B2 | 5/2007 | Kephart | |
| 7,912,381 B2 * | 3/2011 | Knapp et al. | 398/207 |
| 2004/0174909 A1 | 9/2004 | Marais et al. | |

* cited by examiner

*Primary Examiner* — John A Tweel, Jr.

(74) *Attorney, Agent, or Firm* — Rader, Fishman & Grauer PLLC (57) ABSTRACT

A system comprises an electronic device including at least one input for receiving at least one enable signal and external data. The system also comprises a wake-up circuit including at least one input for receiving at least one informational signal, an output for sending the at least one enable signal to the electronic device, and a data interface for external configuration of the wake-up circuit. If the at least one informational signal satisfies predefined criteria, the wake-up circuit enables the electronic device by way of the at least one enable signal before the external data is received by the electronic device.

20 Claims, 3 Drawing Sheets

T0: Power applied
T1: Ignition ON received
T2: Powerup state timer > Powerup Timeout, or Awake message received
T3: Ignition OFF received
T4: Ignition ON received
T5: Shutdown state timer > Shutdown Timeout
T6: Pre-idle state timer > Pre-Idle Timeout
T7-T11: Power source health in condition 1
T12: Ignition ON received
T13: Power source health in condition 2
T14: Power source health in condition 3
T15: Power applied, if PWR=0 in OFF state

Fig. 3

DIAGNOSTIC SYSTEM HAVING A WAKE-UP CIRCUIT

CROSS-REFERENCE TO RELATED APPLICATIONS

This application claims priority based on U.S. Provisional Patent Application No. 61/116,824, filed Nov. 21, 2008, which is incorporated herein by reference in its entirety.

BACKGROUND

Diagnostic systems may include a data retrieval device to record data from electronic control units, such as an engine control module in a vehicle. Enabling these devices often requires manual intervention, such as a person pressing a button, or receiving an electrical trigger signal from the electronic control unit. Once enabled, the diagnostic system can only begin receiving data from the electronic control unit after performing a boot sequence. However, while the diagnostic system is performing the boot sequence, the electronic control unit may begin to output valuable start-up information. Therefore, the start-up information is unknown to the diagnostic system.

Accordingly, a diagnostic system that is able to receive start-up information from the electronic control unit is needed. Specifically, a diagnostic system is needed having a wake-up circuit to enable the diagnostic system before the electronic control unit outputs valuable start-up information.

BRIEF DESCRIPTION OF THE FIGURES

Generally, like components are numbered the same in each figure, such that the same number on multiple figures represents the same type of component although the specific implementation may be different.

DETAILED DESCRIPTION

A diagnostic system may be used to retrieve data from an electronic control unit, such as an engine control module of a vehicular electronic system. The diagnostic system may include a wake-up circuit for enabling operation of an electronic device, such as a data logger or an instrumentation device, with at least the capability of a data retrieval device. The operation of the electronic device ("data logger") may be enabled at a time before an electronic control unit ("ECU") under test begins to output valuable start-up information.

Data loggers may require a period of time in the form of a start-up time to perform a boot sequence before data collection begins. The wake-up circuit mitigates the start-up time by enabling the data logger in advance of anticipated ECU operation, or at the earliest indication that the ECU is about to begin outputting data. As a result, the opportunity to capture all of the data outputted from the ECU is maximized.

The wake-up circuit may additionally be configured to protect against unintentional power source depletion by the diagnostic system. The wake-up circuit may disable (e.g., apply a disabling signal) or disenable (e.g., remove a previously-applied enable signal) operation of the data logger based upon an indication that a power source is reaching or has reached a depleted state. The wake-up circuit may further bring itself to a low power state, based on criteria such as a status of the power source or an elapsed time, such that the wake-up circuit in that low power state draws a reduced amount of current. As discussed below, one or more lower power states may be implemented.

Diagnostic System

Figure 1:
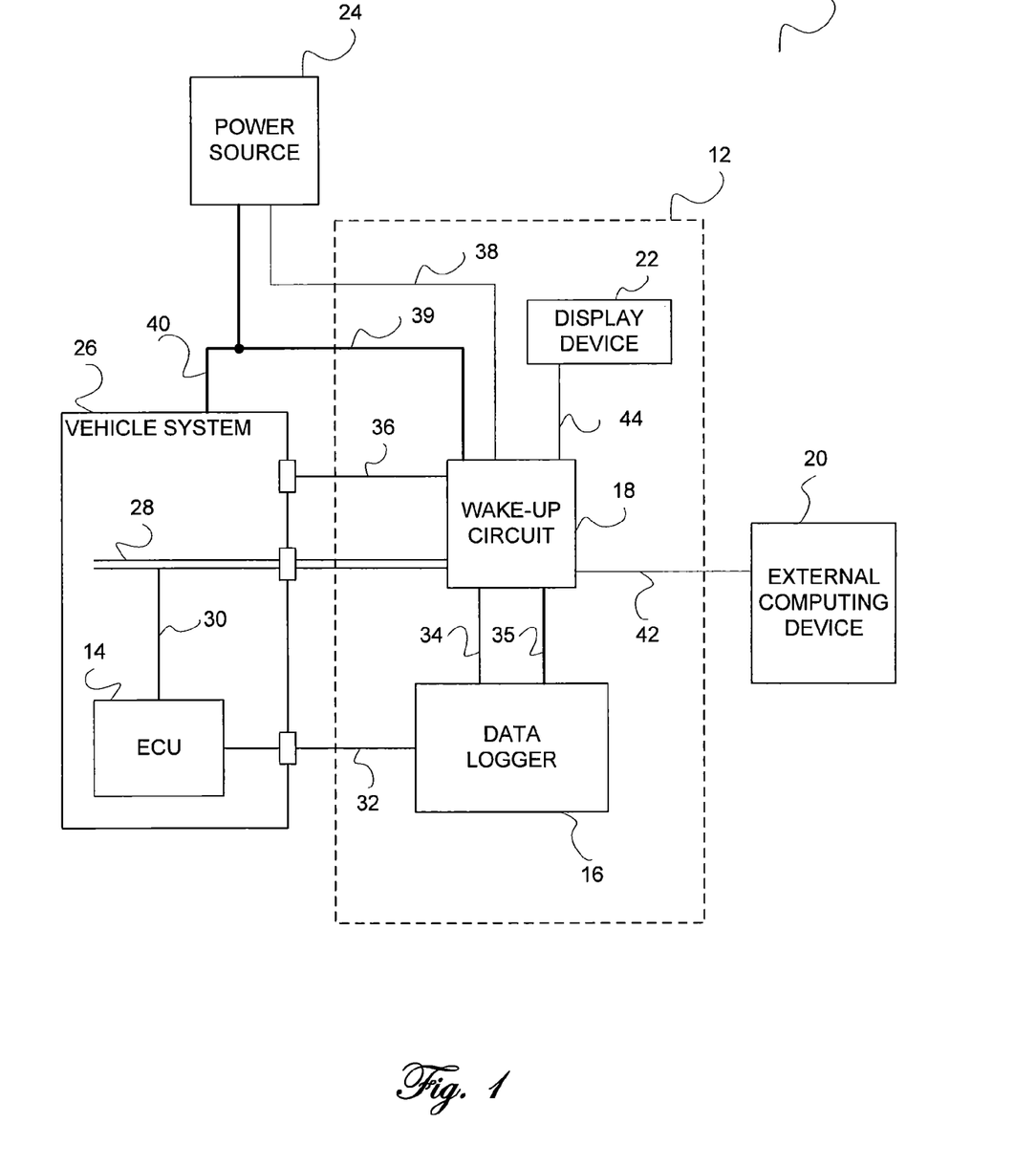
FIG. 1 is a block diagram of an exemplary control and monitoring system.

Referring to FIG. 1, system 10 illustrates an exemplary control and monitoring system, in which a diagnostic system 12 monitors a controller such as an ECU 14.

The diagnostic system 12 includes a data logger 16 for at least the retrieving and storing of data from the ECU 14. A wake-up circuit 18 enables, disables or disenables the data logger 16 under certain conditions. The wake-up circuit 18 may be configurable through a computing device such as an external computing device 20, and may be in communication with a display device 22. A power source 24 provides power to the diagnostic system 12 and may also provide power to a vehicle system 26 and/or to the ECU 14.

In the example shown in FIG. 1, and in the following descriptions, the ECU 14 is part of a vehicle system 26; however, the diagnostic system 12 is not limited to monitoring the ECU 14 in a vehicle system 26, but may instead be used to monitor an ECU 14 in other settings.

Fully or partially automated systems, wherein a microprocessor-based ECU receives input signals indicative of various system operating conditions and processes same according to logic rules to issue command output signals to one or more system actuators or other devices, are known. An ECU 14 that is used in a vehicle system 26 may be any type of electronic module, including but not limited to an engine control module. There may be multiple ECUs 14 in the vehicle system 26. The diagnostic system 12 may monitor multiple ECUs 14 substantially simultaneously.

The vehicle system 26 may include a communications bus 28, representing communication between two or more devices. The term "communications bus" may encompass the physical structure of a communication link, hardware protocols of the physical link, software protocols for communications across the link, or any combination thereof. For example, the communications bus 28 may be based on SAE J1708, SAE J1850, ISO 11898, ISO 9141-2, Keyword 2000, or Controller Area Network (CAN) (e.g., SAE J1939) vehicle-communication protocols, Flexray, Bluetooth, WiFi, WiMax, or any other wired or wireless standard or proprietary protocol. The communications bus 28 may also represent a plurality of buses that use the same protocol or different protocols, and that may or may not be in communication with each other. System 10 and vehicle system 26 do not require a communications bus 28; it is shown as part of the vehicle system 26 to illustrate a familiar vehicle implementation, for a better understanding of one of the possible system 10 implementations.

The various components of system 10 may be interconnected via connections such as those numbered 30, 32, 34, 36, 38, 42 and 44 in FIG. 1. A connection may represent multiple types of interfaces, each of which may be unidirectional or bidirectional, may be wired or wireless, and may use any method of communication. For example, a connection may be a type of communication bus 28, or may be one or more discrete or analog signals, or may be a combination of a communication bus, discrete signals, and analog signals. The physical implementation of the connections includes the use of metal, optic fiber, ceramic or other wired conductors, or radio, infrared, ultrasound or other frequency wireless transmissions. System 10 may include more or less connections than shown in FIG. 1. For example, the ECU 14 may be in communication with the bus 28 via connection 30; however, such communication is not necessary for the operation of the diagnostic system.

The data logger 16 retrieves information from the ECU 14 and from other sources within the vehicle system 26 over a connection 32. The data logger 16 may have the functionality of an instrumentation system, such that it not only retrieves and logs information from the ECU 14 but also may interact with the ECU 14 to modify operation of the ECU 14. The data logger 16 may be capable of analyzing and/or interpreting data from the ECU 14, and may include a display device or may be connected to a display device (not shown.) The data logger 16 may be any device capable of the functions described, such as a computing device, including but not limited to a laptop computer. The data logger 16 is connected to the wake-up circuit 18 through one or both of a connection 34 and a power feed 35. Power feed 35, if used, is any appropriate connection for providing power in the diagnostic system 12 as designed, including but not limited to wire made of a conductive material, an inductive connection, printed circuit board traces, nuts, bolts, screws, locating pins, etc., or some combination thereof, and including multiple instantiations.

The wake-up circuit 18 may monitor information from the vehicle system 26, including from ECU 14. When the information received satisfies predefined criteria, the wake-up circuit 18 may perform an action related to the data logger 16. The wake-up circuit 18 may also perform actions related to the data logger 16 based on other information, such as information regarding the power source, or other information received internally or externally. Actions taken by the wake-up circuit with respect to the data logger 16 may include sending an enable signal, removing an enable signal, sending a disable signal or removing a disable signal over connection 34. Enabling/disabling may also include enabling or disabling power going to the data logger 16 over power feed 35, as described in more detail below.

Information regarding the power source 24 may be obtained by the wake-up circuit 18 by monitoring power source 24 information over a connection 38 from the power source 24, or by monitoring the power source 24 voltage, current or other power source 24 information over a power feed 39. The connection 38, separate from the power feed connection 39, may be included in the diagnostic system 12 between the wake-up circuit 18 and the power source 24 to allow for communication, such as status queries from the wake-up circuit 18 to the power source 24 or status updates from the power source 24 to the wake-up circuit 18. Communication of information other than status is also possible over connection 38.

Information regarding the power source 24 may also be received via a connection 36. Power feed 39 may be any connection appropriate for the system 10 as designed. The power source 24 information includes the power source 24 health condition information.

If the wake-up circuit 18 determines that the power source 24 health is in or is approaching or recovering from a critical state, according to predefined criteria, the wake-up circuit 18 may take actions with respect to the data logger 16 as described above. Predefined criteria may include thresholds. For example, if power source 24 voltage falls below a low-voltage threshold, or power source 24 current falls below a low-current threshold, a criterion may be satisfied. Predefined criteria may be related to voltage and/or current trends that tend to indicate a decline or improvement in the health of the power source 24. The predefined criteria are not limited by these examples.

If the wake-up circuit 18 determines that the power source 24 health is in or is approaching a critical health state, the wake-up circuit 18 may put itself into a low power state. Alternatively, the wake-up circuit 18 may transition itself into a sequence of lower power states corresponding to progressively more critical power source 24 health. The wake-up circuit 18 may transition itself out of a low power state when the power source 24 health has recovered to a condition satisfactory for the transition. The determinations that the power source 24 is in, is approaching, or is recovering from a critical health state may each be made based on the predefined criteria mentioned above with respect to monitoring the power source, or may be based on different or additional criteria of the same or different type.

The power source 24 is shown in FIG. 1 as sourcing power to both the diagnostic system 12 and to the vehicle system 26 system through connections 39 and 40, respectively. However, both the diagnostic system 12 and the vehicle system 26 may be sourced from independent or interconnected power sources. The power source 24 may be a single source or multiple sources, and may include self-diagnostic capability. The power source 24 may also include a computing device and communication capability, for communication over a communications bus such as communications bus 28, or for communication over connection 38. The particular structure and capability of power source 24 will depend on the particular implementation of the system 10.

In one exemplary implementation the power source 24 for a vehicle system 26 may be one or more batteries. The wake-up circuit 18 power monitoring functionality is advantageously used in battery-powered systems, where a diagnostic system 12 can undesirably drain a battery when left powered for extended periods of time.

The wake-up circuit 18 may be configurable through the external computing device 20. Configuration may include defining the criteria used by the wake-up circuit 18 to determine when to enable, disable or disenable the data logger 16 or when to put the wake-up circuit 18 into a low power state. The external computing device 20 may communicate with the wake-up circuit 18 for purposes other than configuration; for example, the wake-up circuit 18 may provide status indicators or other data to the external computing device 20. The wake-up circuit 18 and the external computing device 20 are connected through a connection 42. The connection 42 is any connection appropriate for communication with the selected external computing device 20.

The wake-up circuit 18 may further be configurable through any of the connections 28, 34, 35, 36, 38, 39, 42 or 44.

The wake-up circuit 18 may further be connected to a display device 22 through a connection 44. The display device 22 is shown in FIG. 1 as part of the diagnostic system 12; however, the display device 22 may alternatively be external to the diagnostic system 12. The display device 22 may allow for a visual representation of information received or generated by the wake-up circuit 18, and may include a user interface for bidirectional communication between the wake-up circuit 18 and the display device 22. The connection 44 is any connection appropriate for communication with the selected display device 22.

The wake-up circuit 18 may be a stand-alone module, or may be a daughter board physically located within the ECU 14 or within the data logger 16, or within any other device, including a device not shown in FIG. 1.

The data logger 16 may receive power, an enable signal, and a disable signal from the wake-up circuit 18 and/or from other sources. In this configuration, the data logger 16 may include a state machine for setting priority for the power, enable signal, and disable signal. Such a state machine is dependent on the hardware and software structure of the data logger 16, as well as the defined power management strategy for the system 10.

The Wake-Up Circuit

Figure 2:
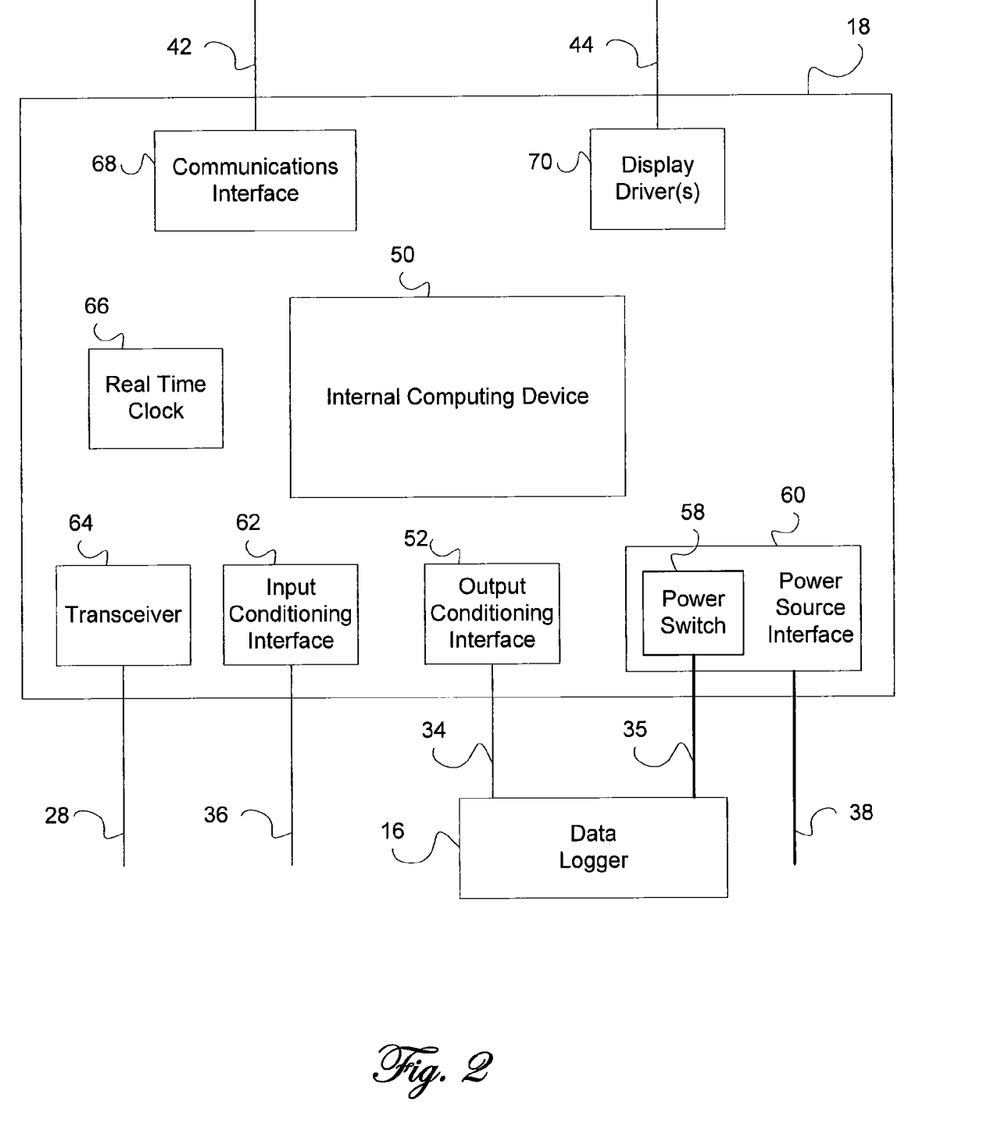
FIG. 2 is a block diagram of an exemplary wake-up circuit.

Referring now to FIG. 2, the wake-up circuit is described in more detail. An exemplary wake-up circuit 18 may include a programmable internal computing device 50, an output conditioning interface 52, a power switch 58, a power source interface 60, an input conditioning interface 62, a transceiver 64, a real time clock 66, a communications interface 68, and display drivers 70. These components will be described individually below. Each of these components may in turn include various sub-components. Furthermore, the entire wake-up circuit, or portions of it, may be implemented in one or more integrated circuit (IC) chip, or may be implemented in one or more Field Programmable Gate Array (FPGA) or other programmable hardware device. The wake-up circuit 18 may include more or less functionality than indicated by FIG. 2 and may depend in part on a particular implementation.

The internal computing device 50 may be implemented as a circuit based upon any combination of one or more of the set of: programmable microcontroller, Application Specific Integrated Circuit (ASIC) and Field Programmable Gate Array (FPGA). The internal computing device may alternatively be any other device with capabilities as discussed. The internal computing device 50 executes at least a state machine 100 (shown in FIG. 3). The state machine 100 may be implemented in software, or may alternatively be part of the physical structure of the internal computing device 50. The state machine 100, as executed by the internal computing device 50, defines at least in part the behavior of the wake-up circuit 18.

The output conditioning interface 52 is connected to the data logger 16 via connection 34 and power feed 35. In response to instructions from the internal computing device 50, the output conditioning interface may output a signal to the data logger 16. Instructions from internal computing device 50 to output conditioning interface 52 may be in the form of serial data, or may be in the form of other digital or analog signals. Output conditioning may include, but is not limited to, any or all of such functions as filtering, adding voltage offsets, providing hysteresis, performing voltage or current scaling, providing isolation, and translating between protocols.

In one exemplary illustration, the internal computing device 50 issues an instruction to the output conditioning interface 52 to enable the data logger 16. The output conditioning interface 52 responds by outputting an enable signal to the data logger 16 over connection 34. In another exemplary illustration, the internal computing device 50 issues an instruction to the output conditioning interface 52 to wake up the data logger 16. The output conditioning interface 52 responds by outputting a wake-up signal to the data logger 16 over connection 34.

According to another exemplary approach for enabling the data logger 16, the internal computing device 50 issues an instruction to activate a power switch 58 that connects the power source 24 to the data logger 16 over connection 35. This instruction may go directly to the power switch 58, or to a power source interface 60 to activate the power switch 58. The power switch 58 may also be used to switch power to devices other than the data logger 16. The power source interface 60 is connected to the power source 24 via connection 38, and may provide a direct connection between the power source 24 and the power switch 58, or alternatively may include circuitry between the power source 24 and the power switch 58. The power switch 58 may comprise one or more discrete components or integrated circuits, or some combination of discrete components and integrated circuits.

The power source interface 60 may provide circuit protection and/or filtering on the power input from power source 24, and may include circuitry for switching power to other portions of the wake-up circuit 18, or for switching power to other devices not shown. Additionally, the power source interface 60 may include circuitry for setting the wake-up circuit 18 into one or more low power states. The power source interface 60 may include the capability to recognize a power source 24 health condition. For example, power source interface 60 may recognize a low voltage or current condition. Recognition of a power source 24 health condition may also be performed partly or wholly by the internal computing device 50.

The input conditioning interface 62 of the wake-up circuit 18 may include discrete components or integrated circuits or some combination of discrete components and integrated circuits. Signals from the vehicle system 26 are received at the input conditioning interface 62 via connection 36 and conditioned to be usable by the internal computing device 50 or other circuits. Signals may be provided to the internal computing device or other circuits in the form of serial data, or in the form of analog or digital signals. Input conditioning may include, but is not limited to, any or all of such functions as filtering, adding voltage offsets, providing hysteresis, performing voltage or current scaling, providing isolation, and translating between protocols.

The transceiver 64 provides an interface between the vehicle system 26 communications bus 28 and the internal computing device 50. Transceivers are known for translating protocols from both a software perspective and a hardware perspective. The transceiver 64 may perform software and/or hardware translation, and may comprise discrete components or integrated circuits or some combination of discrete components and integrated circuits.

The real time clock 66 keeps track of time. It may track time absolutely, by communicating with, for example, a global positioning system (GPS). Absolute time may then be available from the real time clock 66 by year, month, week, day, hour, minute, second, and divisions of seconds, for example. Alternatively, the real time clock 66 may track time relatively, providing elapsed time as measured from a pre-defined event occurrence. The real time clock 66, whether it tracks time absolutely or relatively, is selected based on the resolution and accuracy required by the wake-up circuit 18.

The real time clock 66 may include a signal output providing time information that signals the internal computing device 50 or other device that a certain time has been reached or that a certain time has elapsed or that a time event has occurred. Alternatively, the real time clock 66 may provide time information in response to a request. Time information may be encoded for efficient transmission and computation purposes. The real time clock 66 may be a stand-alone device within wake-up circuit 18, or may be integrated with the internal computing device 50, or integrated with any other circuitry of wake-up circuit 18. Alternatively, the real time clock may be located external to the wake-up circuit. The real time clock 66 may have a dedicated power source such that the real time clock 66 may continue tracking time when the rest of the wake-up circuit 18 is unpowered or in a low power state.

Time information, such as that described with respect to the real time clock 66, may alternatively be received by the wake-up circuit from a source other than the real time clock 66, and may, for example, be received over the input conditioning interface 62.

The communications interface 68 may be a telecommunications standard such as Recommended Standard 232 (RS232) for communicating with an external computing device 20 having a software configuration utility. The software configuration utility may be used to define system settings and variables, and may allow a user of the diagnostic system 12 to define a logical combination of inputs that will cause the wake-up circuit 18 to perform an action with respect to the data logger 16, including inputs such as timeout values or message content received over a message-based connection. Moreover, the software configuration utility may be used to define how data is displayed on the display device 22 by display driver 70. In one exemplary approach, the settings may be downloaded to the wake-up circuit 18 and stored on an on-board non-volatile memory device that may be integrated within the internal computing device or may be a stand-alone device (not shown). Once programmed, the wake-up circuit 18 may be disconnected from the external computing device 20 and begin autonomous operation. The wake-up circuit 18 may later be reconnected to the external computing device 20 to allow modification of these settings.

The display driver 70 may be configured to output a status to the display device 22 for viewing during diagnostic testing. In one exemplary approach, the display driver drives, via a 3.3 Volt pulse width modulation (PWM) signal, a display device 22 that includes light emitting diodes (LEDs). The display driver 70 may also include a bi-directional connection to the display device 22 to provide for a user interface at the display.

Exemplary Function

Once powered and enabled, the data logger 16 may perform a boot sequence, and then begin collecting data after the boot sequence is completed. A boot sequence may include, but is not limited to, changing the data logger 16 default settings to predefined initial system operation settings, establishing synchronization with external communication buses such as communications bus 28, setting outputs to a known state, and reading inputs to determine current system state. The boot sequence takes time to perform, and it is desirable to complete this sequence before the ECU 14 under test begins operation, so that the data logger 16 is able to monitor the ECU 14 during the ECU 14's start-up phase. Towards this end, the wake-up circuit 18 may enable the monitoring function of the data logger 16 under various conditions and based on received information.

In one exemplary approach, the wake-up circuit 18 enables the data logger 16 based on time information. For example, the real time clock 66 may signal the internal computing device 50 to enable or power the data logger 16. Alternatively, the internal computing device 50 may be configured to receive a current absolute or relative time from the real time clock 66 and compare the current time to a predefined wake-up time. In another alternative approach, time information is received from a source other than the real time clock 66. Based on time information from the real time clock 66 or other source, the internal computing device 50 may instruct the output conditioning interface 52 to enable the data logger 16, via a trigger signal on connection 34 or by applying power on power feed 35.

The wake-up circuit 18 may also disable the data logger 16 based on time information. For example, if the ECU 14 has been inactive for a predefined time period, the wake-up circuit 18 may send a disable signal to, or remove an enable signal from, the data logger 16, or may switch the power to the data logger 16 off.

In another exemplary approach, the wake-up circuit 18 may monitor traffic on a communications bus 28, and enable or power the data logger 16 in response to detected message traffic. The internal computing device 50 may be configured to monitor the communications bus 28 via the network transceiver 64, to detect when any message, or a particular message, or one of a set of particular messages is present on the communications bus 28. The internal computing device 50 may further be configured to instruct enablement or powering of the data logger 16 upon detection of a message that meets predefined criteria. In one exemplary implementation, the message transmitted may include an identification block and a content block, and the internal computing device 50 may instruct enablement or powering of the data logger 16 based on the information contained in the identification block, in the content block or in both. The identification block may include information about the type of message being transmitted, while the content block may include the actual content of the message. For instance, in an automotive application, the identification block may indicate that the message transmitted relates to vehicle system 26 speed, while the content block includes the encoded numerical value of current vehicle system 26 speed.

The wake-up circuit 18 may also disable the data logger 16 based on a communications bus 28 status or message information. For example, if the communications bus 28 has been inactive for a predefined time period, or if a sleep message is received, the wake-up circuit 18 may send a disable signal to, or remove an enable signal from, the data logger 16, or may switch the power to the data logger 16 off.

In yet another exemplary approach, the wake-up circuit 18 may monitor signals received through the input conditioning interface 62 via connection 36. For example, when the voltage of a signal received at the input conditioning interface 62 crosses a predefined threshold, the wake-up circuit 18 may enable or power the data logger 16. One implementation of this approach is for the input conditioning interface 62 to be connected to a vehicle system 26 interior dome light that turns on when the vehicle system 26 doors are unlocked. When a voltage is detected across the dome light, the wake-up circuit 18 enables or powers the data logger 16. In addition, or alternatively, the wake-up circuit 18 may monitor the message content of messages received through input conditioning interface 62 if the interface includes a serial data interface. The wake-up circuit 18 may also be configured to compare the strength of signals transmitted by one or more ECUs 14, and instruct enablement or powering of the data logger 16 if the comparison meets predefined criteria.

The wake-up circuit 18 may also disable the data logger 16 based on signals received through the input conditioning interface 62 via connection 36. For example, if a sleep input is received, the wake-up circuit 18 may send a disable signal to, or remove an enable signal from, the data logger 16, or may switch the power to the data logger 16 off.

The wake-up circuit 18 may also be configured to preserve the power source 24 by operating in one or more low current mode. For example, if the power source 24 voltage drops below a first predefined threshold, the wake-up circuit 18 may be set to a first low power state, in which some of the functionality of the wake-up circuit is disabled to reduce power load. If the voltage drops below a second predefined threshold, the wake-up circuit 18 may be set to a second low power state, in which more of the wake-up circuit is disabled to reduce more power load. Alternatively, there may be additional low power states or no low power states, or the wake-up circuit may be disabled or shut off completely in one of the low power states. In one exemplary approach, the wake-up circuit 18 may return to partial or full function once the voltage exceeds a third predefined level.

The State Machine

Figure 3:
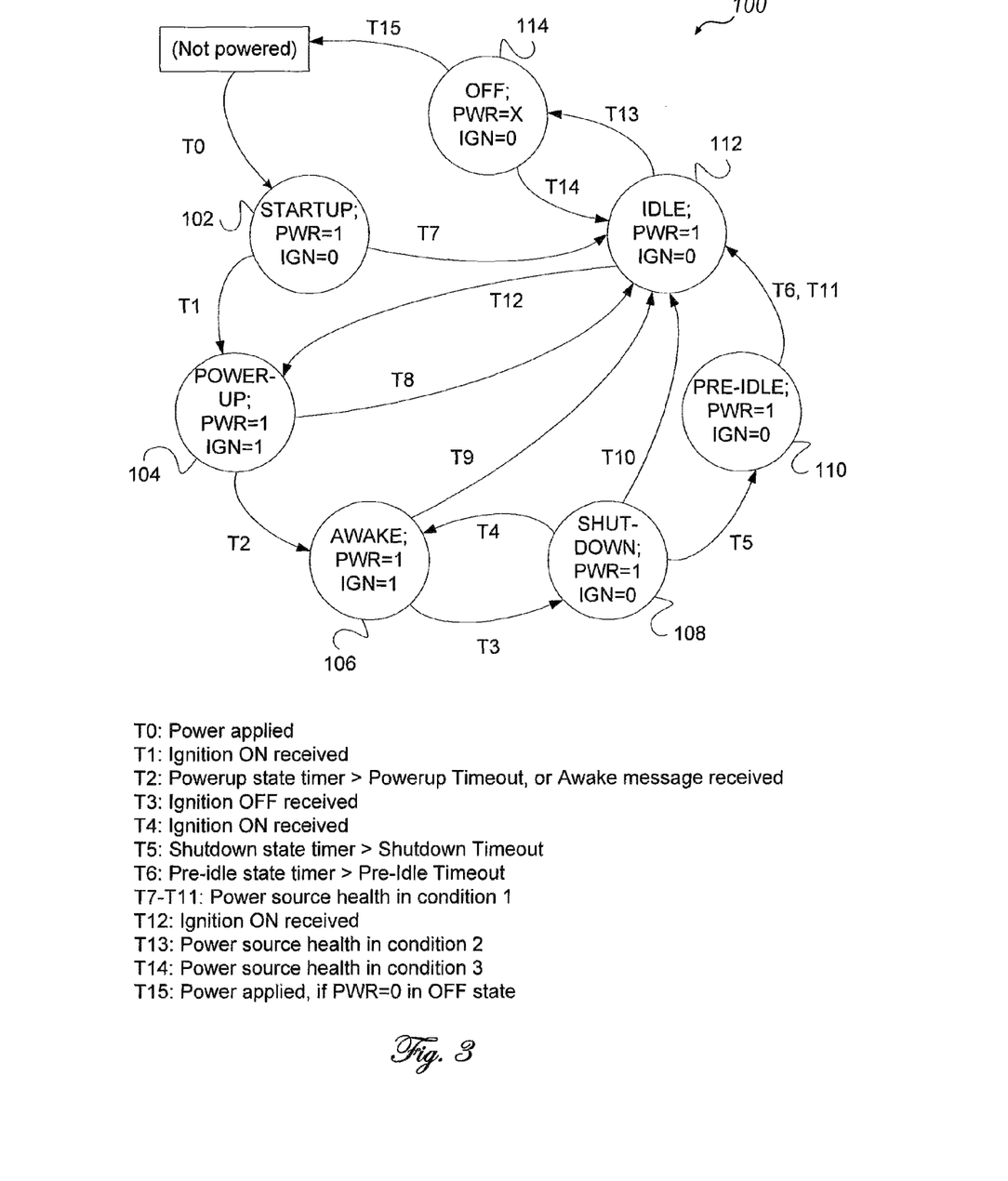
FIG. 3 is an exemplary state diagram of a state machine executed by a computing device in the wake-up circuit.

FIG. 3 is a state diagram that is an exemplary illustration of the state machine 100 executed by the internal computing device 50 of wake-up circuit 18. In the illustration of FIG. 3, the wake-up circuit 18 recognizes, in addition to other signals as described below, an ignition (IGN) signal from the vehicle system 26. The state diagram of FIG. 3 illustrates powering up the wake-up circuit 18 only while the ignition is OFF (IGN=0), although it is also possible to power up the wake-up circuit 18 when the ignition is ON (IGN=1).

As previously discussed, the wake-up circuit 18 provides to or removes from the data logger 16 an enable signal or power feed in response to inputs received through the input conditioning interface 62 or transceiver 64, or in response to a signal from the real time clock 66 or other time information source, or in response to power source 24 health status indicators. The internal computing device 50 determines what functions to perform in certain states or transitions of the state machine 100 based on signals and indicators such as these. The IGN signal in the state diagram is representative of any signal or indicator that can cause a state transition.

Power to the wake-up circuit 18 is designated as PWR. Wake-up circuit 18 must have power to operate (PWR=1) and therefore, PWR=1 is shown in all operational states of the state diagram. The PWR indication does not necessarily reflect the status of the vehicle system 26 or of ECU 14, because the wake-up circuit 18 may operate at lower or higher power levels than do other systems. The PWR indication on the state diagram also does not necessarily reflect the health condition of the power source 24, because the wake-up circuit 18 may be disconnected from the power source 24, or the wake-up circuit 18 may be operational while the power source 24 is in a non-optimal or a critical state.

At any state of the state machine 100, the removal of power to the wake-up circuit 18 will shut off the wake-up circuit 18, and therefore the function represented by the state diagram would not apply. Accordingly, although a transition to unpowered is possible at each state in the state diagram, those transitions are not shown.

At transition T0, the internal computing device 50 enters the Startup 102 state when power is applied to the previously unpowered wake-up circuit 18. If the internal computing device 50 recognizes an Ignition ON signal while in the Startup 102 state, it transitions to the Powerup 104 state, as indicated by transition T1. The internal computing device 50 transitions to the Awake 106 state when the time spent in the Powerup 104 state exceeds a predefined Powerup Timeout threshold or when an Awake message is received from the external computing device 20 through the communications interface 42, as indicated by transition T2. In the Powerup 104 state or Awake 106 state, the internal computing device 50 may request that the output conditioning interface 52 send an enable signal through connection 34 to the data logger 16 or may request that the power switch 58 be activated.

The internal computing device 50 will transition from the Awake 106 state to the Shutdown 108 state on receipt of an ignition OFF signal, as represented by transition T3, and will transition from the Shutdown 108 state back to the Awake 106 state on receipt of an ignition ON signal, as represented by transition T4. If no ignition ON signal is received by the internal computing device 50 before the time spent in the Shutdown 108 state exceeds a predefined Shutdown Timeout threshold, the internal computing device 50 will transition to a Pre-idle 110 state, as indicated by transition T5.

From the Pre-idle 110 state, the internal computing device 50 transitions to the Idle 112 state when time spent in the Pre-idle 110 state exceeds a predefined Pre-idle Timeout threshold, as indicated by transition T6.

In the Shutdown 108, Pre-idle 110 or Idle 112 state, or in the transition to one of these states, the internal computing device 50 may disable or disenable selected circuits of the wake-up circuit 18 by signaling a power regulator (not shown) in the Power Source Interface 60 to switch power off to particular circuits of the wake-up circuit 18 while maintaining power to the internal computing device 50, for example, to reduce the power load. Likewise, the data logger 16 may be disabled or disenabled in the Shutdown 108, Pre-idle 110 or Idle 112 states or in the transition to these states.

From the Startup 102, Powerup 104, Awake 106, Shutdown 108, and Pre-idle 110 state, the internal computing device 50 will transition to the Idle 112 state if it recognizes a first predefined power source 24 health condition. These transitions are represented on the state diagram as transitions T7, T8, T9, T10 and T11, respectively. The Idle 112 state, or the transition to that state, may be implemented, for example, by signaling a power regulator (not shown) in the Power Source Interface 60 to switch power off to particular circuits of the wake-up circuit 18 while maintaining power to the internal computing device 50. Likewise, the data logger 16 may be disabled or disenabled in the Idle 112 state, or in the transition to that state.

From the Idle 112 state, the internal computing device 50 will transition to the Powerup 104 state upon receipt of an ignition ON signal, as indicated by transition T12.

From the Idle 112 state, the internal computing device 50 will transition to the Off 114 state if it recognizes a second predefined power source 24 health condition, as indicated by transition T13, and will transition back to the Idle 112 state if it recognizes a third predefined power source 24 health condition, as indicated by transition T14.

The first, second and third predefined power source 24 health conditions may be, for example, that the power source 24 voltage has crossed a threshold voltage level. All three health conditions may be the same condition, although there should be some hysteresis built in between the second and third health condition to prevent the wake-up circuit 18 from cycling between the Idle 112 and Off 114 states. The criteria for establishing that the power source 24 is in one of the three health conditions may be established through configuration by the external computing device 20, as discussed above.

The transition T15 indicates that power may be removed from the wake-up circuit 18 in the Off 114 state, and then when power is re-applied, the wake-up circuit restarts in the Startup 102 state.

The state diagram of FIG. 3 is for illustration only. Many other states and transitions may be included in the state machine. Likewise, not all of the states and transitions shown must be used. For example, power source 24 health conditions may not be monitored at all, and transitions to low power states may then be based on, e.g., timing information.

Computing devices, such as the internal computing device 50 and external computing device 20, may generally include applications, which may be software applications tangibly embodied as a set of computer-executable instructions on a computer readable medium within the computing device. A computing device may be any one of a number of computing devices, such as a personal computer, handheld computing device, cellular telephone, embedded microprocessor, etc. Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

The diagnostic system 12 may include a variety of hardware and/or software, and communicate with one or more computer servers associated with a relational database management system (RDBMS) from which data may be extracted. However, the diagnostic system 12 may also represent other mechanisms for providing data, such as data stored in one or more files and obtained via file transfer protocol (FTP) or the like, data obtained from a computer-readable medium such as a disk or tape, or even manual entry of data, among other possible mechanisms. The precise number and type of computer servers included in the diagnostic system 12 is not crucial. Further, it is not crucial that any of the information be stored in any particular data store. Thus, the diagnostic system 12 may be configured to a variety of architectures.

Data stores may be associated with various computing devices and may include a relational database management system (RDBMS). An RDBMS generally employs Structured Query Language (SQL) in addition to a language for creating, storing, editing, and executing stored procedures, such as the PL/SQL language mentioned above. However, it is to be understood that data stores associated with a computing device may be some other kind of database such as a hierarchical database, a set of files, and an application database in a proprietary format, etc. A data store often includes a computing device employing a computer operating system such as one of those mentioned above, and are accessed via a network in any one or more of a variety of manners, as is well known.

State machine 100, as well as any method steps described herein may be generally tangibly embodied as one or more sets of computer-executable instructions stored on a computer-readable medium. Such computer readable-medium may be included in or associated with one or more computing devices, even if such devices are not illustrated in the Figures. The method steps accordingly generally execute within one or more such computing devices.

A computer-readable medium includes any medium, including a tangible medium, which participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of tangible computer-readable media include, for example, floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The tangible computer-readable medium may include instructions for performing any of the steps previously recited. However, it is to be appreciated that the tangible computer-readable medium may include instructions for performing steps other than those recited. It is to be further appreciated that some of steps may be performed by the computer, whereas other steps may be performed by a person or another computer.

Transmission media may include coaxial cables, copper wire, and fiber optics, including the wires that comprise a system bus coupled to a processor. Transmission media may include or convey acoustic waves, light waves and electromagnetic emissions, such as those generated during radio frequency (RF) and infrared (IR) data communications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites explicitly to the contrary.

We claim:

1. A system comprising:
an electronic device including at least one input for receiving at least one enable signal and external data; and
a wake-up circuit including at least one input for receiving at least one informational signal, an output for sending the at least one enable signal to the electronic device, and a data interface for external configuration of the wake-up circuit;
wherein, if the at least one informational signal satisfies predefined criteria, the wake-up circuit enables the electronic device by way of the at least one enable signal before the external data is received by the electronic device.

2. The system of claim 1, wherein an informational signal represents time information.

3. The system of claim 2, the wake-up circuit further comprising a computing device that transitions the wake-up circuit to a low power state based at least in part on the time information.

4. The system of claim 1, wherein an informational signal represents a health condition of a power source.

5. The system of claim 4, the wake-up circuit further comprising a computing device that transitions the wake-up circuit to a low power state based at least in part on the health condition of the power source.

6. The system of claim 4, wherein the wake-up circuit further outputs a disable signal and the electronic device further receives the disable signal, wherein the wake-up circuit outputs the disable signal to the electronic device based at least in part on the health condition of the power source.

7. The system of claim 1, wherein the wake-up circuit further outputs a disable signal and the electronic device further receives the disable signal, the disable signal disabling function of the electronic device irrespective of the status of the at least one enable signal.

8. The system of claim 1, wherein an enable signal of the at least one enable signal is in the form of power for operation of the electronic device.

9. A method comprising:
receiving at least one enable signal and external data at an electronic device;
receiving at least one informational signal at a wake-up circuit;
outputting the at least one enable signal from the wake-up circuit to the electronic device;
determining that the at least one informational signal satisfies predefined criteria;
enabling the electronic device by way of the at least one enable signal before receiving external data at the electronic device; and
configuring the wake-up circuit through a data interface.

10. The method of claim 9, the wake-up circuit operating independently of the data interface.

11. The method of claim 9, including the receiving of the at least one informational signal from a communications link as part of a message.

12. The method of claim 9, the at least one informational signal including a signal representing time information.

13. The method of claim 9, the at least one informational signal including a signal representing a health condition of a power source.

14. The method of claim 13, the wake-up circuit further outputting a disable signal and the electronic device further receiving the disable signal, the wake-up circuit outputting the disable signal to the electronic device based on a health condition of the power source.

15. The method of claim 9, the electronic device further receiving a disable signal, the disable signal disabling function of the electronic device irrespective of the status of the at least one enable signal.

16. The method of claim 9, wherein an enable signal of the at least one enable signal is in the form of power for operation of the electronic device.

17. A system comprising:
a data logger including
an input for receiving external data, and
an input for receiving an enable signal;
a wake-up circuit including
an input for receiving at least one informational signal, the at least one informational signal including at least one of time information and power source health information,
a computing device that uses the at least one informational signal to determine actions to take, the actions including transitioning the wake-up circuit to a low power state in response to the at least one of time information and power source health information,
an output for sending the enable signal to the data logger in response to an instruction received from the computing device, and
a data interface for external configuration of the wake-up circuit;
wherein, if the at least one informational signal satisfies first predefined criteria, the wake-up circuit enables the data logger by way of applying the enable signal before the external data is received by the data logger; and
wherein, if the at least one of time information and power source health information satisfies second predefined criteria, the wake-up circuit disables the data logger.

18. The system of claim 17, the data logger further comprising:
a disable signal that, when received by the data logger, disables its functionality,
wherein the disable signal disables function of the data logger irrespective of the status of the enable signal.

19. The system of claim 17, the data logger further comprising:
a power feed that, when received by the data logger, enables its functionality,
wherein the enable signal and the power feed must be present to enable operation of the data logger.

20. The system of claim 17, the data logger further comprising:
a power feed that, when received by the data logger, enables its functionality, and
a disable signal that, when received by the data logger, disables its functionality,
wherein the disable signal disables function of the data logger irrespective of the status of the enable signal and the power feed.

* * * * *